(No Model.) 2 Sheets—Sheet 1.

F. L. M. SMITH & W. J. BRYAN.
APPARATUS FOR PRODUCING VARIEGATED LIGHTS.

No. 479,673. Patented July 26, 1892.

Witnesses

Inventors
Frank L. M. Smith,
William J. Bryan,
By their Attorney
T. W. Robertson.

(No Model.) 2 Sheets—Sheet 2.
F. L. M. SMITH & W. J. BRYAN.
APPARATUS FOR PRODUCING VARIEGATED LIGHTS.
No. 479,673. Patented July 26, 1892.
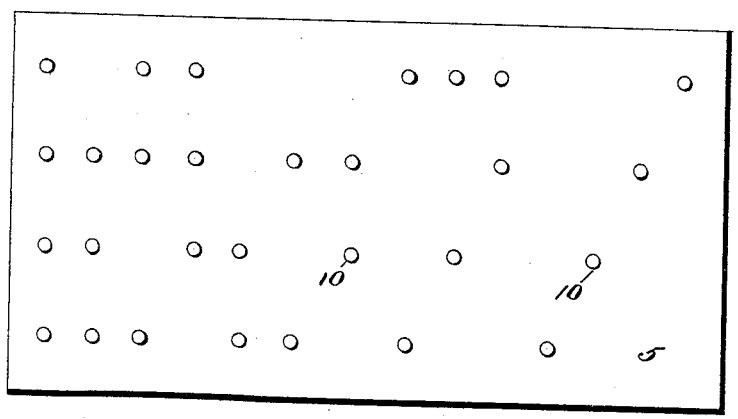
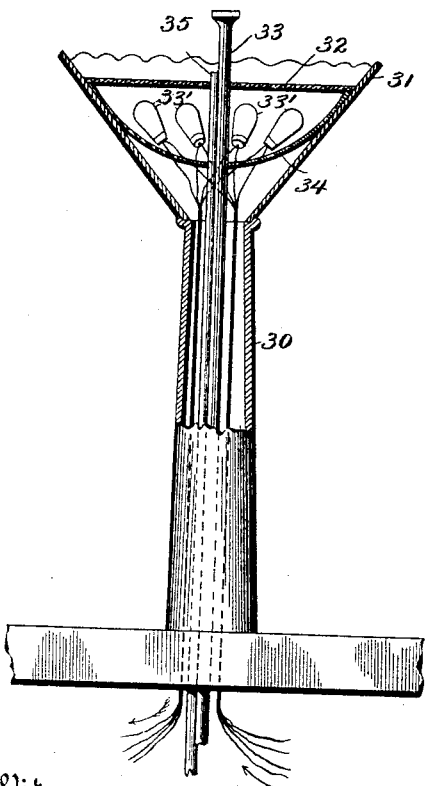
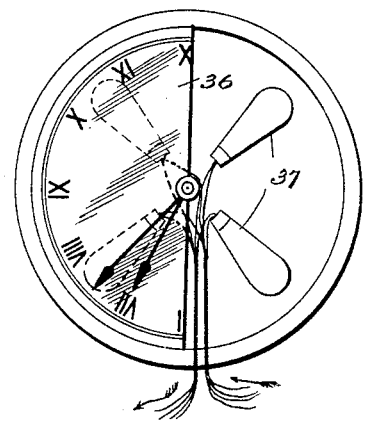
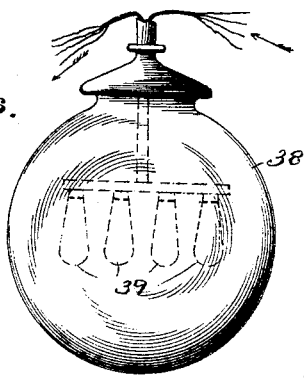

UNITED STATES PATENT OFFICE.

FRANK L. M. SMITH AND WILLIAM J. BRYAN, OF CHICAGO, ILLINOIS.

APPARATUS FOR PRODUCING VARIEGATED LIGHTS.

SPECIFICATION forming part of Letters Patent No. 479,673, dated July 26, 1892.

Application filed January 5, 1892. Serial No. 417,071. (No model.)

*To all whom it may concern:*

Be it known that we, FRANK L. M. SMITH and WILLIAM J. BRYAN, citizens of the United States, residing at Chicago, in the county of Cook and State of Illinois, have invented certain new and useful Improvements in Apparatus for Producing Variegated Lights, of which the following is a specification, reference being had therein to the accompanying drawings.

This improvement is designed to produce a variegated light for advertising and other purposes; and the invention consists in the peculiar construction, arrangement, and combination of parts hereinafter more particularly described, and then definitely claimed, by which this method is carried out.

Figure 1:
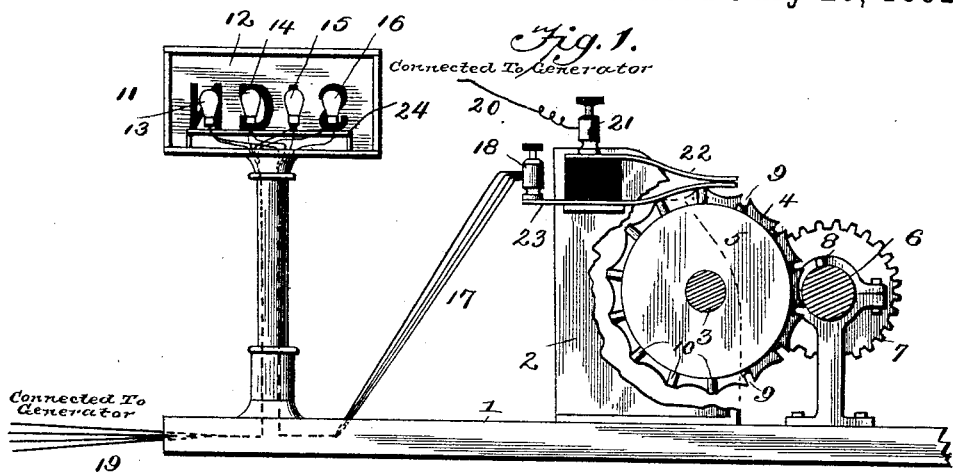
Figure 2:
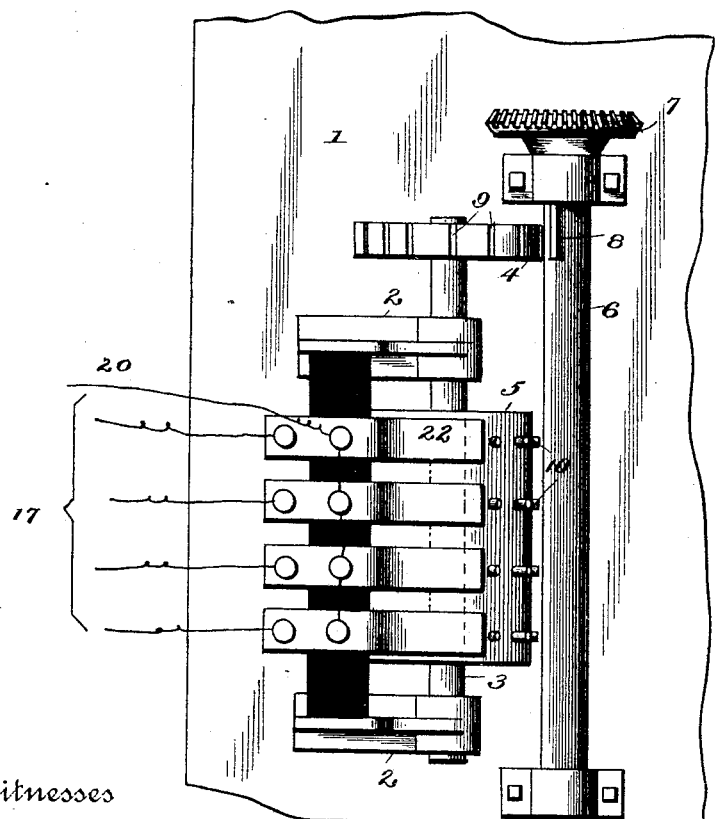

In the accompanying drawings, which show one way of carrying out our improvement, Figure 1 is a side view, partly in section, of a sign and a device for producing a variegated light for illuminating the same. Fig. 2 is a plan of the device used for changing the color of the lights. Fig. 3 is a plan of the surface of the changing-cylinder. Fig. 4 is an elevation of a fountain, partly in section, constructed according to our improvement; Fig. 5, a similar representation of a clock; Fig. 6, an elevation of a globe, also constructed according to our improvement.

Referring now to the details of the drawings by figures, 1 represents the base of any suitable material, on which is set standards 2, supporting the shaft 3, carrying the wheel 4 and cylinder 5, both fast on the shaft. At 6 is shown another or driving shaft, which may be connected with any suitable motor by the gear-wheel 7 and is provided with a single tooth 8, which engages in the notches 9 of the wheel 4, and thus said wheel 4, the shaft 3, and cylinder 5 are turned one-fourteenth of a revolution at each turn of the shaft 6, there being fourteen notches or teeth in said wheel 4. On the cylinder 5 is shown a series of teeth 10, arranged as shown in Fig. 3 or in any desired manner to suit the taste or will of the maker or user, the object of which will be hereinafter explained.

At 11 is shown a box forming a frame for a transparent sign 12, on which is shown the word "Sign" or any other required lettering. At the back of this sign is shown a series of incandescent electric lamps 13, 14, 15, and 16, of differently-colored glass, 13 being preferably red, 14 green, 15 blue, and 16 yellow. Each of these incandescent lights has one of its wires 17 carried to the changing device and connected to it by a binding-post 18, while the other wires 19 of the lamps are connected with a generator of electricity, (not shown,) to which is also connected the wire 20, connected to the binding-posts 21.

Mounted upon the standards 2 is a bar of hard rubber or other suitable insulating material, carrying two sets of thin brass plates 22 and 23, forming contact-points, which plates are arranged so as to be quite free from each other when not pressed together. Each wire 17 is connected by the binding-post 18 to a plate 23, and the wire 20 is connected by the binding-posts 21 to the plates 22, as shown in Fig. 2, or a separate wire may be connected to each plate 22, if preferred. If now the wires 19 and 20 are connected to any suitable source of electric energy and either of the plates 23 be made to touch the plate 22 above it, a circuit will be established and the colored lamp connected with that particular wire will be in action and the sign will show the color of that lamp. If two of the plates 23 touch two of the plates 22, then two differently-colored lamps will be in action, and the sign will then show the color produced by the combined colors of the lamps so made active, and the same result will follow if three or four of the plates 23 are made to touch a corresponding number of the plates 22. From this it will be seen that a great many variations of shades of color may be produced by different combinations of lamps. To produce these combinations in succession is the object of the cylinder 5 and its teeth 10, one of which (preferably the teeth) should be of non-conducting material. As the cylinder 5 is revolved the teeth 10 come in contact with the plates 23 and make them touch the plates 22, thus establishing the circuit through these connections and putting into action the lamps connected to the plates that are in contact with the plates 22. Suppose, for instance, that only the plate 23, connected to the red lamp, is raised by one of the pins 10. Then only that light is shown; but when the cylinder is turned one tooth more and the next plate 23 is pressed against the plate 22 above it then the green lamp will be in action, and so on with all the different lamps singly. After all these are shown the fifth series of teeth come into action, which will show both the red and green lamps, and the sign will then show the effect produced by the combination of both these colors. The next turn of the shaft 6 will put in action the red and blue lamps, and the next turn the red and yellow. Another turn will give the green and blue, another green and yellow, and another blue and yellow. The next turn will bring three lamps—red, green, and yellow—into action, while the next turn will give red, green, and blue, and the following turn will give green, yellow, and blue. The next turn will bring all four of the lamps into action, and thus all four of the colors are combined. After this the single lamps come into action, as before, and all the series of combinations are again repeated and will continue to be repeated as long as the shaft 6 turns and the electric current is supplied. It will thus be seen that with four lamps fourteen different combinations of colors may be produced. Of course more or less than four lamps may be used, and the greater the number of the lamps the greater is the number of colors and combinations of colors that will be produced.

We have shown this apparatus for use in connection with an illuminated sign; but it may of course be used for other purposes—as, for instance, in connection with an illuminated fountain, clock, &c.—without departing from the spirit of our invention.

As examples of such devices, we refer to Figs. 4, 5, and 6. In Fig. 4, 30 represents a hollow standard, and 31 the basin of a fountain, the latter having a glass bottom 32 to receive the water that issues from the nozzle of the pipe 33, which passes through said glass. Beneath this glass are the differently-colored incandescent lamps 33', which are to be connected with a suitable generator and changing device, such as heretofore described. Below these lamps is a reflector 34 to throw the light from the lamps upon the water issuing from the nozzle of the pipe 33. At 35 is shown a waste-pipe to carry off the waste water. In Fig. 5 we have indicated one way of applying our invention to a clock, which is provided with a translucent face 36, (only half of which is shown,) behind which is set a series of differently-colored incandescent lamps 37, according to the taste or desire of the owner or maker, which lamps are to be connected to generator and changing device, substantially as before described. In Fig. 6 a translucent globe 38 is shown, having a series of differently-colored incandescent lamps 39 inside it, which are to be connected with the generator and changing device, as before. Either of these devices and many others that might be described can be used to produce very beautiful effects in changing and variegating colors. The fountain, for instance, when suitably connected will give forth sprays or jets of water that will be constantly changing color as the different lamps beneath the basin are energized, producing effects that will delight the beholder. To produce the best effect, the glass on which the sign is painted should be ground or otherwise made translucent and the box forming the frame of the sign and containing the lamps should be lined with mirrors 24 or other good reflecting surface.

In the above description we have given means of carrying out our improvement, but do not wish to be limited thereto, as various ways may be devised to vary the construction without departing from the spirit of our invention. For instance, various devices may be designed to make and break the electric circuits besides those shown by any one conversant with electric mechanism by the ordinary skill of the electrician's art.

What we claim as new is—

1. The combination, with a series of differently-colored lamps, of a single chamber inclosing all of said lamps and having semi-transparent material on one or more of its sides and means, substantially as described, for automatically bringing said lights into action in combination, whereby said material will transmit colors differing from either of the lamps, as set forth.

2. The combination, with a series of differently-colored electric lamps, of a single chamber inclosing all of said lamps and having semi-transparent material on one or more of its sides, electric circuits for said lamps, and mechanism, substantially as described, for automatically breaking and making said circuits, as set forth.

3. The combination, with a series of differently-colored electric lamps, of a single chamber inclosing all of said lamps and having one or more of its sides covered with semi-transparent material, a series of electric circuits and contacts therefor corresponding to the lamps, and a revolving cylinder provided with means for automatically closing said circuits, substantially as described.

4. The combination, with a series of differently-colored electric lights, of a single chamber inclosing all of said series of lights, having one or more of its sides capable of transmitting light, a series of electric circuits corresponding to the lamps, and a like series of plates 22 and 23, forming part of said circuits and normally holding them open, and a rotary cylinder provided with teeth to close said circuits and set the lamps in action in different combinations, substantially as described.

5. The combination, with a series of differently-colored electric lights, of a single chamber inclosing all of said series of lights, having one or more of its sides capable of transmitting light, a series of electric lamps inclosed therein, a series of electric circuits corresponding to the lamps, and a like series of plates 22 and 23, forming part of said circuits and normally holding them open, a rotary cylinder provided with teeth to close said circuits and set the lamps in action in different combinations, and means for giving said cylinder an intermittent rotary motion, substantially as described.

In testimony whereof we affix our signatures, in presence of two witnesses, this 28th day of December, 1891.

FRANK L. M. SMITH.
WILLIAM J. BRYAN.

Witnesses:
J. C. TARKINGTON,
JOHN J. ARNEY.